United States Patent [19]
Hatton

[11] 3,717,285
[45] Feb. 20, 1973

[54] APPARATUS FOR SPRAYING A SLURRY

[75] Inventor: John H. Hatton, North Hollywood, Calif.

[73] Assignee: Sta-Soil Corporation, North Hollywood, Calif.

[22] Filed: June 28, 1971

[21] Appl. No.: 157,277

[52] U.S. Cl. ............... 222/136, 134/169 C, 222/148, 239/662
[51] Int. Cl. ............................................. B67d 5/34
[58] Field of Search .............. 239/662; 222/148, 136; 134/166 R, 166 C, 169 R, 169 C

[56] References Cited

UNITED STATES PATENTS

| 2,645,524 | 7/1953 | Kelly | 222/148 X |
| 3,586,245 | 6/1971 | Carlyon | 239/662 |
| 2,500,816 | 3/1950 | Gird | 222/136 X |
| 3,212,518 | 10/1965 | Padek | 222/148 X |
| 3,463,172 | 8/1969 | Naylor | 134/169 R |
| 3,580,420 | 5/1971 | Kennedy et al. | 222/148 X |

Primary Examiner—Richard A. Schacher
Attorney—Jack C. Munro

[57] ABSTRACT

A spraying apparatus is provided which may, for example, be carried by a truck, and which is used for spraying mulch, fertilizer or seed, or any combination thereof, on planting sites. The spraying mechanism of the invention has auxiliary fresh water tanks mounted on either side of a main mixing tank, the auxiliary tanks being filled with fresh water when the main mixing tank is filled. The mechanism of the invention also includes coupling pipelines and valves which permit fresh water in the auxiliary tanks to be used, when needed, to flush out the hoses and nozzles of the mechanism when a particular job is terminated.

4 Claims, 3 Drawing Figures

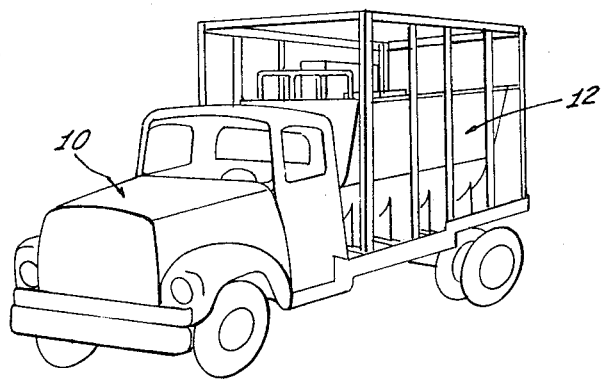
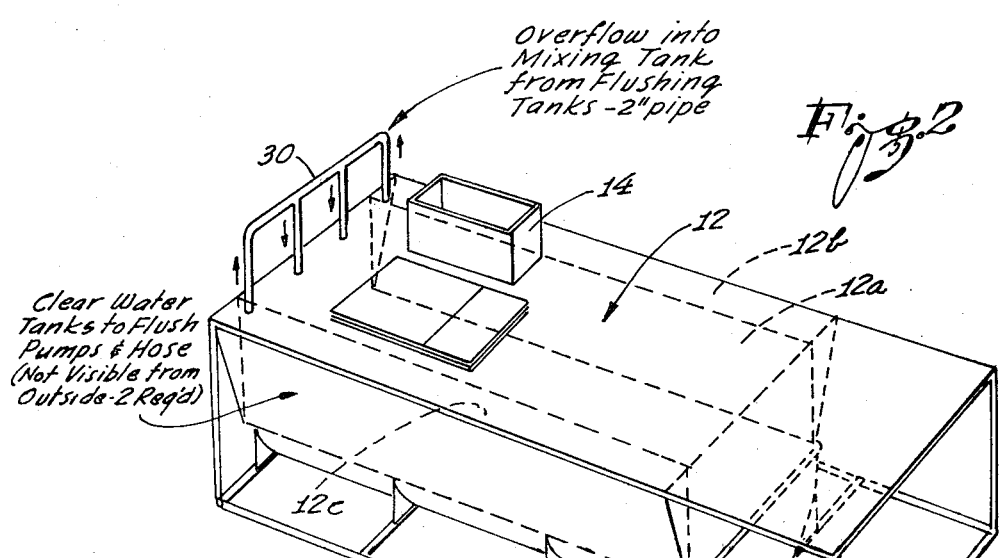
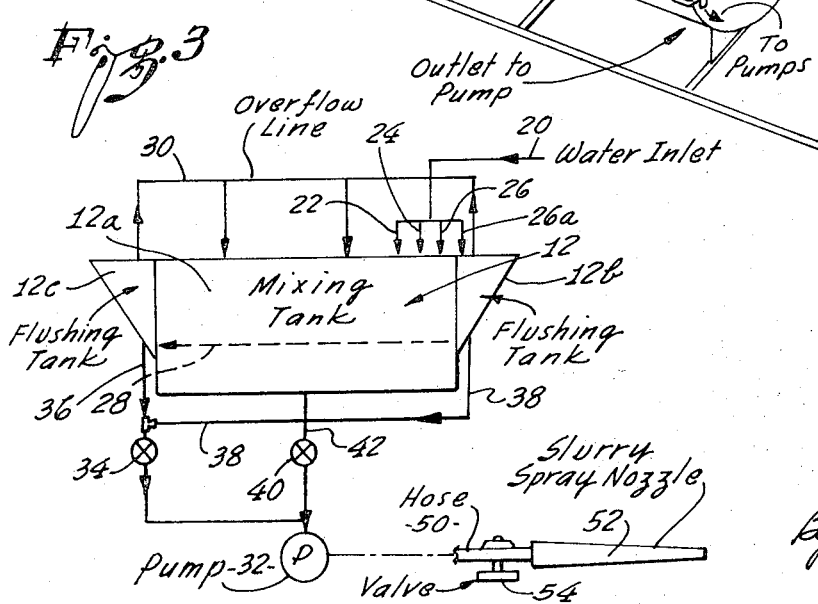

APPARATUS FOR SPRAYING A SLURRY

BACKGROUND OF THE INVENTION

It is usual in the present state of the art, in the fertilizing, mulching and/or seeding of large planting areas, including the slopes adjacent public highways, to use trucks with appropriate mechanisms supported thereon. The mechanisms of the prior art usually include a large tank having mixing paddles, or the like, therein, and which is filled with water, mulch, fertilizer and seed, the ingredients being mixed in the tank into a slurry.

The prior art mechanism also usually includes a pump which serves to pump the resulting slurry out of the mixing tank, and at relatively high pressure and velocity into the hose of a spraying nozzle. Then, as the truck is driven around or past the planting area, an operator on the back of the truck directs the slurry at high velocity over the area.

A feature of the present invention is the provision in such a mechanism of means for conveniently flushing out the hoses and nozzles after a particular job. This is accomplished, as described above, by the provision of auxiliary flushing tanks in the apparatus, and of appropriate pipelines and valves so that the pump of the mechanism may be coupled from the mixing tank to the flushing tanks, so that flushing water, instead of mulch, is supplied to the hoses and nozzles.

BRIEF DESCRIPTION OF THE DRAWINGS

FIG. 1 is a perspective illustration of the apparatus of the invention mounted on a truck;

FIG. 2 is a perspective representation of the mixing and auxiliary tanks supported on the truck in FIG. 1; and FIG. 3 is a schematic representation of the various components of the mechanism of the invention, and the manner in which they are coupled to one another.

DETAILED DESCRIPTION OF THE ILLUSTRATED EMBODIMENT

As shown in FIG. 1, the mechanism of the invention may be mounted on a truck 10. The mechanism includes a tank structure 12 mounted on the back of the truck. The tank structure, as shown in FIG. 2, includes a central mixing tank 12a, and a pair of auxiliary tanks 12b and 12c. The main mixing tank has a generally rectangular configuration, with a rounded bottom, and the auxiliary tanks 12b and 12c are mounted at the opposite sides of the main tank. The ingredients such as seed, fertilizer, mulch, or the like, are introduced into the main mixing tank 12a through an inlet feed chamber 14 mounted on the top of the tank.

The tanks of the mechanism of FIG. 1 are filled with water, derived, for example, from a hydrant, or other pressurized source, through the pipeline system shown schematically in FIG. 3. For example, a hose coupled to the hydrant may be coupled to an inlet line 20 which, for example, may have a diameter of three inches, and which is split, for example, into three two inch pipes 22, 24 and 26 to feed the water into the mixing tank 12a. One of the two inch pipes 26, for example, has a branch 26a which extends into the flushing tank 12b to fill the flushing tanks 12a and 12b with water. The flushing tanks are intercoupled, for example, by an internal pipeline 28. In order to avoid any chance of the flushing tanks being damaged, appropriate overflow lines 30 are provided between the flushing tanks and the mixing tank. As best shown in FIG. 2, the overflow lines 30 may also serve as a hand rail at the back of the mechanism.

The mechanism includes a pump 32 which is coupled selectively, either to the mixing tank 12a, or to the flushing tanks 12b and 12c by a valve 34 and pipelines 36 and 38 on one hand, and by a valve 40 and pipeline 42 on the other hand. It will be appreciated that when the valve 34 is closed and valve 40 is open, the pump will pump slurry from the mixing tank 12a. On the other hand, when the valve 40 is closed and the valve 34 is open, the pump will pump from the flushing tanks 12b and 12c. The outlet of the pump 32 is coupled through an appropriate hose 50 to a usual slurry spray nozzle 52, the flow of slurry to the nozzle being controlled by a valve 54 adjacent the nozzle.

When a usual spraying operation is to be carried out, the valve 40 is opened, and the valve 34 is closed. The mixing tank 12a is filled with water, and appropriate ingredients are introduced into the mixing tank through the feed inlet 14. The mixing tank is filled with water, and at the same time the flushing tanks 12b and 12c are also filled with water. The mixing mechanism in the mixing tank is then activated, so that the ingredients may be mixed into a slurry. The pump 32 is then activated. In usual prior art mechanisms, the pump 32 serves to circulate the slurry from the mixing tank and back into the mixing tank, and the hose 50 is coupled to the circulating line, so that a portion of the slurry is forced through the spray nozzle 52 when the valve 54 is opened. In this way, the valve 54 may be closed at will, and the slurry then merely circulates through the system.

In the mechanism of the present invention, at the termination of any particular job, the valve 34 is opened and the valve 40 is closed, so that flushing water is drawn by the pump 32 from the flushing tanks 12b and 12c, and is used to flush out the hoses 50 and spray nozzles 52. This greatly facilitates the operation of the mechanism, and provides a simple and expeditious means for maintaining the hoses and spray nozzles free of slurry, which, when dry, has a tendency to clog these components.

It will be appreciated that although a particular embodiment of the invention has been shown and described, modifications may be made. It is intended to cover all such modifications in the following claims which come within the spirit and scope of the invention.

What is claimed is:

1. A mechanism for spraying a slurry comprising:
    a main mixing tank containing the slurry;
    an auxiliary tank assembly providing a reservoir for flushing water, said tank assembly being connected to said main tank;
    a pump having an inlet and an outlet;
    conduit means connecting said pump intake to both said main tank and said tank assembly;
    valve means included within said conduit means and actuatable to couple the pump selectively to said mixing tank or to said auxiliary tank assembly;

a nozzle assembly and associated hose coupled to said outlet of said pump, whereby said valve means is capable of producing conduction of slurry from said main mixing tank to said nozzle means, said valve means also capable of causing conduction of water from said auxiliary tank assembly to said nozzle to clean residual amounts of slurry from within said nozzle and said associated hose; and said auxiliary tank assembly including a pair of spaced apart separate auxiliary tanks, said auxiliary tanks being interconnected together through an interconnecting conduit, inlet means to conduct water into one of said auxiliary tanks which in turn fills the other of said auxiliary tanks through said interconnecting conduit, said auxiliary tanks being closed to the ambient except through said inlet conduit.

2. The mechanism as defined in claim 1 wherein:

said conduit means comprises a first conduit connected between said pump and said main mixing tank and a second conduit connected between said auxiliary tank assembly and said pump, said valve means includes two separate valves, one of said valves included within said first conduit and the other of said valves included within the second conduit.

3. The mechanism as defined in claim 2 wherein:

an overflow line assembly is connected between said auxiliary tanks and said main mixing tank, whereby overfilling of said auxiliary tanks automatically is conducted into said main mixing tank.

4. The mechanism as defined in claim 3 wherein:

said main mixing tank has a substantially rectangular configuration, said auxiliary tanks being mounted on opposite sides of said main mixing tank.

* * * * *